US012780709B2

(12) United States Patent
Gopal et al.

(10) Patent No.: US 12,780,709 B2
(45) Date of Patent: Nov. 3, 2026

(54) APPARATUS AND METHOD FOR MANUFACTURING AN OPTICAL FIBER USING NON-CONTACT PNEUMATIC LEVITATION

(71) Applicant: Sterlite Technologies Limited, Haryana (IN)

(72) Inventors: Pawar Gopal, Haryana (IN); Balamurugan Karunanidhy, Haryana (IN); Pranjal Mishra, Haryana (IN); Sudhakar Reddy, Haryana (IN)

( * ) Notice: Subject to any disclaimer, the term of this patent is extended or adjusted under 35 U.S.C. 154(b) by 651 days.

(21) Appl. No.: 18/177,071

(22) Filed: Mar. 1, 2023

(65) Prior Publication Data

US 2023/0399250 A1 Dec. 14, 2023

(30) Foreign Application Priority Data

Jun. 9, 2022 (IN) ............................ 202211032954

(51) Int. Cl.
*C03B 35/00* (2006.01)
*C03B 37/03* (2006.01)

(52) U.S. Cl.
CPC .......... *C03B 35/005* (2013.01); *C03B 37/032* (2013.01)

(58) Field of Classification Search
CPC ............................ C03B 35/005; C03B 37/032
See application file for complete search history.

(56) References Cited

FOREIGN PATENT DOCUMENTS

EP 3666740 A1 * 6/2020 ........... C03B 37/027

OTHER PUBLICATIONS

Machine Translation and Original Publication of EP-3666740-A1 (Year: 2020).*

* cited by examiner

*Primary Examiner* — Tyrone V Hall, Jr.
(74) *Attorney, Agent, or Firm* — Steven R. Fairchild

(57) ABSTRACT

The present disclosure provides an apparatus to levitate an optical fiber having a tubular block defined by a central cavity and a plurality of slit walls. In particular, the tubular block has a reservoir that is adapted to store a fluid at a positive pressure. Each slit wall of the plurality of slit walls comprises one or more side slits and the plurality of slit walls defines a bottom slit such that the one or more side slits and the bottom slit provide one or more paths between the reservoir and the central cavity.

18 Claims, 12 Drawing Sheets

APPARATUS AND METHOD FOR MANUFACTURING AN OPTICAL FIBER USING NON-CONTACT PNEUMATIC LEVITATION

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS REFERENCE TO RELATED APPLICATION

This application claims the benefit of Indian Application No. 202211032954 titled "APPARATUS AND METHOD FOR MANUFACTURING AN OPTICAL FIBER USING NON-CONTACT PNEUMATIC LEVITATION" filed by the applicant on Jun. 9, 2022, which is incorporated herein by reference in its entirety.

FIELD

The present invention relates to the field of optical fibers for optical fiber transmission systems and more particularly, relate to an apparatus for manufacturing an optical fiber using non-contact pneumatic levitation and a method thereof.

BACKGROUND OF THE INVENTION

Optical fibers are used to transmit large amounts of information modulated on an optical signal to longer distances at higher data rates without being hampered by electromagnetic interference. The compact size of optical fibers results in reduced occupancy area by a bundle of optical fibers, however due to the compact size of optical fibers it is very difficult to draw, support and handle optical fibers.

Conventionally, multiple forms of optical tweezers have been used to support, draw and handle compact sized structures such as optical fibers. Further, the optical signal faces Rayleigh scattering, which is responsible for attenuation in the optical signal. Rayleigh scattering is higher in the optical systems without proper cooling mechanism for the bare optical fibers.

Attenuation and sensitivity to heat (or thermal) aging may be critical attributes of optical fibers, particularly for high data rate optical fibers. In making optical fibers, it may be necessary or desirable to minimize attenuation loss in the intended window of operation for the fiber. Attenuation in an optical fiber can increase after fabrication of the fiber because of a phenomenon called "heat aging." Heat aging is the tendency of some optical fibers to increase in attenuation over time low formation of the fibers due to temperature fluctuations in the fiber's environment. Typically, the attenuation change from heat aging may be apparent at approximately 1200 nanometers (nm) with increasing effect up to about 1700 nm in a spectral attenuation plot. Furthermore, attenuation may be the result of Rayleigh scattering loss.

U.S. Pat. No. 9,650,283B2 discloses a method for turning off the fibre using different Reynolds numbers by varying the inlet gas velocities at 3 different positions in 90 degrees.

U.S. Pat. No. 8,074,474B2 and WO2019036260 disclose the turning mechanism of the optical fiber using convex force. The prior arts U.S. Pat. Nos. 9,650,283B2, 8,074,474B2 and WO2019036260 disclose creation of the pressure difference on two sides of the fiber and further disclose air as coolant for the bare fibers.

U.S. Pat. No. 9,650,283B2, due to the use of different Reynolds numbers that are obtained by varying the inlet gas velocities at 3 different positions in 90 degrees, the system of Prior art U.S. Pat. No. 9,650,283B2 suffers higher computational complexity as variables of Reynolds numbers have exponential dependencies.

Due to convex force-controlled creation of pressure, the system of prior arts U.S. Pat. Nos. 9,650,283B2 and 8,074,474B2 use convex force involving polynomial relationship between the variables, thus suffer higher computational complexity.

In light of the above-stated discussion, there is an urgent need for a technical solution that overcomes the above-stated limitations. Thus, the present disclosure aims at providing a technical solution with low computational complexity to draw, support or handle optical fibers and effective in reducing the attenuation in optical fibers.

SUMMARY OF THE INVENTION

Embodiments of the present disclosure provide an apparatus to levitate an optical fiber having a tubular block defined by a central cavity and a plurality of slit walls. The tubular block has a reservoir that is adapted to store a fluid at a positive pressure.

In accordance with an embodiment of the present invention, each slit wall of the plurality of slit walls comprises one or more side slits and the plurality of slit walls defines a bottom slit such that the one or more side slits and the bottom slit provide one or more paths between the reservoir and the central cavity.

In accordance with an embodiment of the present invention, a method to levitate an optical fiber by creating a containment zone for the optical fiber in an apparatus to levitate the optical fiber to facilitate cooling of the optical fiber. For creating the containment zone, the method has step of directing, a fluid at a controlled mass flow rate to at least one slit of the one or more side slits and the bottom slit directly at the optical fiber and at least one slit of the one or more side slits and the bottom slit not directing the fluid at a controlled mass flow rate directly on the optical fiber.

In accordance with an embodiment of the present invention, the method further has a step of directing, the fluid at the controlled mass flow rate to a first side of the optical fiber through at least one slit of the one or more side slits and the bottom slit and directing the fluid at the controlled mass flow rate to a second side of the optical fiber through at least one remaining slit of the one or more side slits and the bottom slit.

In accordance with an embodiment of the present invention, the method further has a step of pulling the optical fiber through the containment zone in a non-contact manner.

The foregoing solutions of the present disclosure are attained by providing an apparatus for manufacturing an optical fiber using non-contact pneumatic levitation and a method thereof.

These and other aspects herein will be better appreciated and understood when considered in conjunction with the following description and the accompanying drawings. It should be understood, however, that the following descriptions are given by way of illustration and not of limitation.

Many changes and modifications may be made within the scope of the invention herein without departing from the spirit thereof.

These and other aspects herein will be better appreciated and understood when considered in conjunction with the following description and the accompanying drawings. It should be understood, however, that the following descriptions are given by way of illustration and not of limitation. Many changes and modifications may be made within the scope of the invention herein without departing from the spirit thereof.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference.

Figure 1A:
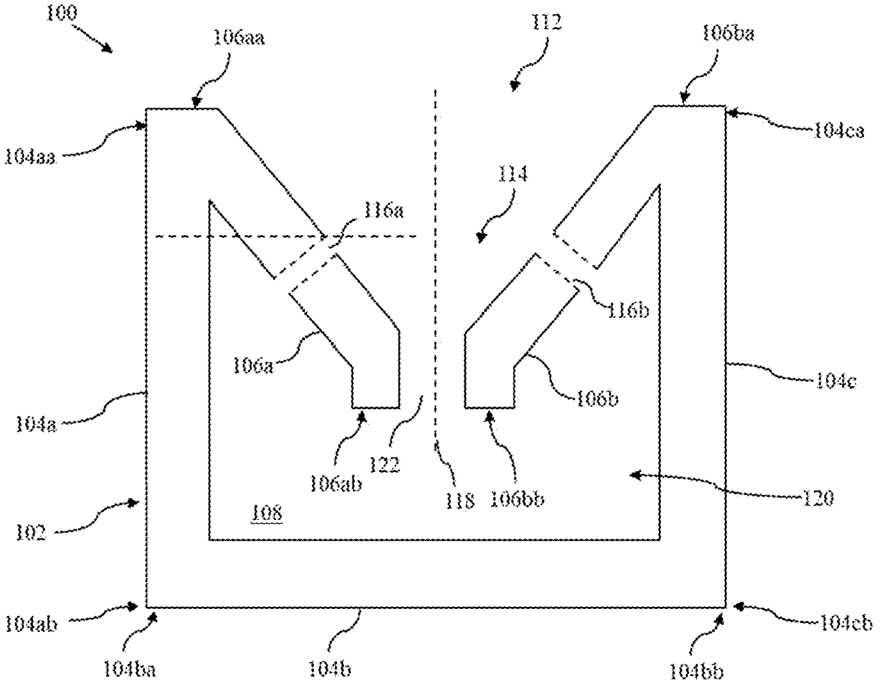
FIG. 1A illustrates a cross-sectional front view of an apparatus in accordance with an embodiment of the present disclosure.

The optical fiber apparatus is illustrated in the accompanying drawings, which like reference letters indicate corresponding parts in the various figures. It should be noted that the accompanying figure is intended to present illustrations of exemplary embodiments of the present invention. This figure is not intended to limit the scope of the present invention. It should also be noted that the accompanying figure is not necessarily drawn to scale.

DETAILED DESCRIPTION OF THE PREFERRED EMBODIMENTS

The principles of the present invention and their advantages are best understood by referring to FIG. 1A to FIG. 10. In the following detailed description numerous specific details are set forth in order to provide a thorough understanding of the embodiment of invention as illustrative or exemplary embodiments of the invention, specific embodiments in which the invention may be practiced are described in sufficient detail to enable those skilled in the art to practice the disclosed embodiments. However, it will be obvious to a person skilled in the art that the embodiments of the invention may be practiced with or without these specific details. In other instances, well known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

FIG. 1A illustrates a cross-sectional front view of an apparatus 100 adapted to pneumatically levitate an optical fiber such that the optical fiber can be turned in a non-contact manner. In particular, the apparatus 100 may be adapted to create a fluid flow pattern such that the optical fiber levitates (i.e., the optical fiber may be suspended in air in a non-contact manner) without touching any surface of the apparatus 100 by virtue of non-contact pneumatic levitation. Further, the apparats 100 may have a tubular block 102 with a plurality of outer walls of which first through third outer walls 104*a*-104*c* are shown, a plurality of slit walls of which first and second slit walls 106*a* and 106*b* are shown, and a reservoir 108.

In accordance with an embodiment of the present invention, the first through third outer walls 104*a*-104*c* and the first and second slit walls 106*a* and 106*b* define the reservoir 108. As illustrated, the first through third walls 104*a*-104*c* may form three sides of the rectangular shaped tubular block 102 such that a fourth side of the tubular block 102 may be a partially opened side.

Particularly, the first wall 104*a* and the third wall 104*c* may be vertical sidewalls and the second wall 104*b* may be a horizontal bottom wall of the tubular block 102. Moreover, the first wall 104*a* may have a first end 104*aa* and a second end 104*ab*, the second wall 104*b* may have a first end 104*ba* and a second end 104*bb*, and the third wall 104*c* may have a first end 104*ca* and a second end 104*cb*. Further, the second end 104*ab* of the first wall 104*a* may be attached to the first end 104*ba* of the second wall 104*b*. Furthermore, the second end 104*bb* of the second wall 104*b* may be attached to the second end 104*cb* of the third wall 104*c* thus forming the tubular block 102.

In accordance with an embodiment of the present invention, the first slit wall 106*a* may have a first end 106*aa* and a second end 106*ab*. Particularly, the second slit wall 106*b* may have a first end 106*ba* and a second end 106*bb*. Moreover, the first end 106*aa* of the first slit wall 106*a* may be attached to the first end 104*aa* of the first side wall 104*a*. Further, the first end 106*ab* of the second slit wall 106*b* may be attached to the first end 104*ca* of the third side wall 104*c*. As illustrated, the first slit wall 106*a* and the second slit wall 106*b* may extend from the first end 104*aa* of the first wall 104*a* and the first end 104*ca* of the third wall 104*c*, respectively, such that the first slit wall 106*a* and the second slit wall 106*b* makes a slit wall angle with respect to a longitudinal axis 118 of the tubular block 102.

In some embodiments of the present disclosure, the slit wall angle may be in a range of 5 degrees to 60 degrees. The first and second slit walls 106*a* and 106*b* may define a central cavity 112 adapted to facilitate in creation of a containment zone 114 for the optical fiber to levitate. In particular, the containment zone 114 may be a zone that may facilitate cooling down the optical fiber by levitating the optical fiber for a predefined time. In other words, the optical fiber may be levitated in the containment zone 114 for the predefined time such that the optical fiber is substantially cooled down.

In accordance with an embodiment of the present invention, the first slit wall 106*a* may have one or more side slits of which a first side slit 116*a* is shown. Similarly, the second slit wall 106*b* may have one or more side slits of which a second side slit 116*b* is shown. Further, the first side slit 116*a* may be an opening and/or an orifice in the tubular block 102 that may extend from a first surface of the first slit wall 106*a* (i.e., proximal to the reservoir 108) to a second surface of the first slit wall 106*a* (i.e., proximal to the central cavity 112). Particularly, the second side slit 116*b* may be an opening and/or an orifice in the tubular block 102 that may extend from a first surface of the second slit wall 106*b* (i.e., proximal to the reservoir 108) to a second surface of the second slit wall 106*b* (i.e., proximal to the central cavity 112). In other words, the first and second side slits 116*a* and 116*b* may be passage points of a fluid 120 held in the reservoir 108. Further, the first and second side slits 116*a* and 116*b* may be connected to the reservoir 108 (at a fluid entry end) and to the central cavity 112 (at a fluid exit end) to facilitate containment of the fluid 120 inside the central cavity 112 to pneumatically levitate the optical fiber.

In some embodiments of the present disclosure, the first and second side slits 116*a* and 116*b* may be adapted to stabilize flow patterns formed by all sources of the fluid 120 (i.e., the reservoir 108 and surrounding atmosphere). Although FIG. 1 illustrates that the first and second slit walls 106*a* and 106*b* includes one side slit (i.e., the first side slit 116*a* and the second side slit 116*b*, respectively), it will be apparent to a person skilled in the art that the scope of the present disclosure is not limited to it. In various other embodiments, the first and second slit walls 106*a* and 106*b* may include more than one side slits without deviating from the scope of the present disclosure.

In such a scenario, each side slit may be adapted to perform one or more functionalities in a manner similar to the functionalities of the first side slit 116*a* and the second side slit 116*b* as described herein.

In some embodiments of the present disclosure, the first and second slit walls 106*a* and 106*b* may have a predefined side slit angle with respect to a longitudinal axis 118 of the tubular block 102. The predefined side slit angle may be in a range of 5 degrees to 90 degrees.

In accordance with an embodiment of the present invention, the second ends 106*ab* and 106*bb* of the first slit wall 106*a* and the second slit wall 106*b*, respectively, may be substantially parallel to one another thus leaving a small separation thereto to form a bottom slit 122. Particularly, the bottom slit 122 may be an opening and/or an orifice in the tubular block 102 that extends from a bottom surface of the tubular block 102 (i.e., proximal to the reservoir 108) towards the central cavity 112. The bottom slit 122 may be adapted to provide the controlled mass flow rates to create the containment zone 114 such that the optical fiber levitates in the containment zone 114 by virtue of the controlled mass flow rates. Further, the second ends 106*ab* and 106*bb* of the first slit wall 106*a* and the second slit wall 106*b*, respectively, may be substantially parallel to one another thus forming the bottom slit 122 that is a V-shaped groove.

In some embodiments of the present disclosure, the V-shaped groove of the bottom slit 122 may have a predefined bottom slit angle with respect to the longitudinal axis 118 of the tubular block 102. The predefined bottom slit angle may be in a range of 30 degrees to 120 degrees.

In an exemplary aspect of the present disclosure, when the predefined bottom slit angle of the bottom slit 122 is 30 degrees, the predefined side slit angle of the first and second side slits 116*a* and 116*b* is 45 degrees.

In another exemplary aspect of the present disclosure, when the predefined bottom slit angle of the bottom slit 122 is 60 degrees, the predefined side slit angle of the first and second side slits 116*a* and 116*b* is 40 degrees.

In yet another exemplary aspect of the present disclosure, when the predefined bottom slit angle of the bottom slit 122 is 90 degrees, the predefined side slit angle of the first and second side slits 116*a* and 116*b* is 90 degrees.

In yet another exemplary aspect of the present disclosure, when the predefined bottom slit angle of the bottom slit 122 is 100 degrees, the predefined side slit angle of the first and second side slits 116*a* and 116*b* is −45 degrees.

In accordance with an embodiment of the present invention, the reservoir 108 may be defined by the first through third walls 104*a*-104*c* and the first and second slit walls 106*a* and 106*b* of the tubular block 102. In particular, the reservoir 108 may be adapted to store the fluid 120 and further release the fluid 120 at controlled mass flow rates to pneumatically levitate the optical fiber in the containment zone 114. Moreover, the reservoir 108 may facilitate controlled flow of the fluid 120 with varying mass flow rates as per requirement to pneumatically levitate the optical fiber in the containment zone 114. Further, the fluid 120 may be adapted to transfer a momentum and/or a pressure to a surface of the optical fiber to pneumatically levitate the optical fiber in a non-contact manner and to facilitate in avoiding contact of the optical fiber to any surface of the apparatus 100.

In some embodiments of the present disclosure, the fluid 120 may include, but is not limited to, a combination of gasses, oxygen, and the like. Preferably, the fluid 120 may be air. Embodiments of the present disclosure are intended to include and/or otherwise cover any type of the fluid 120 that may enable levitation of the optical fiber, including known, related, and later developed fluids.

In accordance with an embodiment of the present invention, the fluid 120 may be held in the reservoir 108 at a positive pressure. Particularly, the positive pressure of the fluid 118 maintained in the reservoir 108 may enable momentum transfer to the surface of the optical fiber. Moreover, the positive pressure of the fluid 120 may enable momentum transfer to the optical fiber by use of controlled gas flow thus making the optical fiber to remain in a non-contact state when the draw tower is in operation. However, when the fluid 120 is not maintained at a positive pressure, the optical fiber may not levitate and may touch the first and second slit walls 106*a* and 106*b* of the tubular block 102.

Figure 1B:
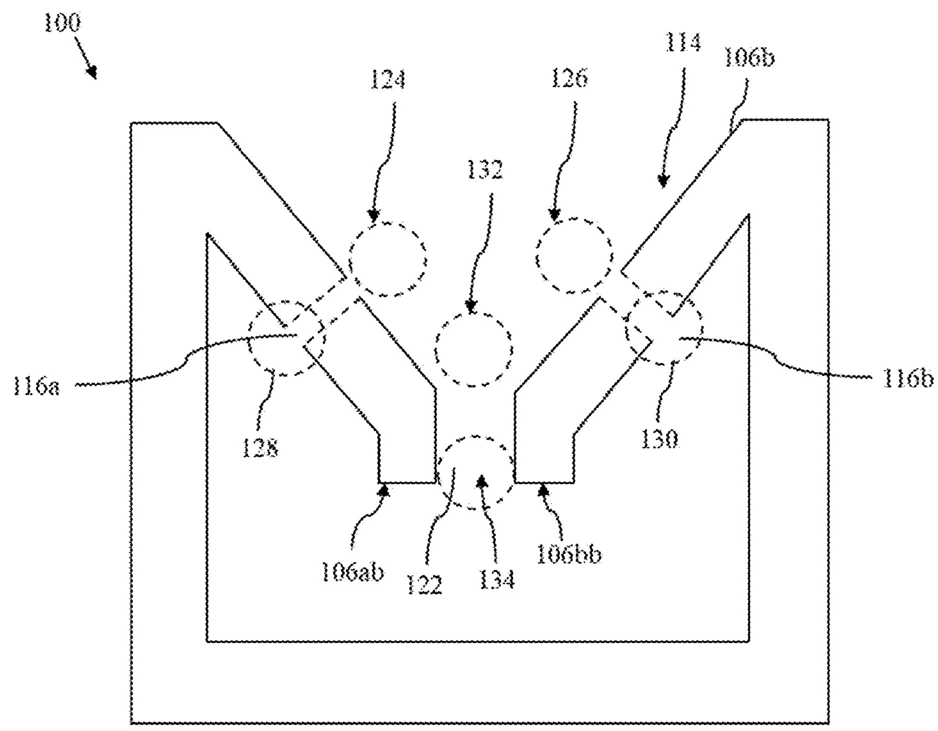
FIG. 1B illustrates another cross-sectional view of the apparatus in accordance with an embodiment of the present disclosure.

FIG. 1B illustrates another cross-sectional view of apparatus 100. The first and second side slits 116*a* and 116*b* may define one or more side entry areas and the bottom slit 122 may define a bottom entry area. The first side slit 116*a* and the second side slit 116*b* may define a first side entry area 124 and a second side entry area 126, respectively. Moreover, the first side entry area 124 may be an area formed at an interface where the first side slit 116*a* opens inside the central cavity 112. Similarly, the second side entry area 126 may be an area formed at an interface where the second side slit 116*b* opens inside the central cavity 112.

In some embodiments of the present disclosure, the first side entry area 124 and the second side entry area 126 may be adapted to provide an opening area through which the fluid 120 can be flown thus maintaining the controlled mass flow rates to create the containment zone 114. Furthermore, the first side slit 116*a* and the second side slit 116*b* may define a first side path area 128 and a second side path area 130. The first side path area 128 and the second side path area 130 may be formed between an entry point of the reservoir 108 to the central cavity 112 to enable flow of the fluid 120 from the reservoir 108 to the first side entry area 124 and the second side entry area 126 at controlled mass flow rates to create the containment zone 114.

In accordance with an embodiment of the present invention, the bottom slit 122 may define a bottom entry area 132 that may be an area formed at an interface where the bottom slit 122 opens inside the central cavity 112.

In some embodiments of the present disclosure, the bottom entry area 132 may be adapted to provide an opening area through which the fluid 120 can be flown, thus maintaining the controlled mass flow rates to create the containment zone 114. Furthermore, the bottom slit 122 may define a bottom path area 134 that may be an area defined by a bottom entry area extending from the bottom surface of the tubular block 102 to (i.e., proximal to the reservoir 108) towards the central cavity 112.

In accordance with an embodiment of the present invention, the bottom path area 134 may be formed between an entry point of the reservoir 108 to the central cavity 112 to enable flow of the fluid 120 from the reservoir 108 to the bottom entry area 132 at controlled mass flow rates to create the containment zone 114. In some embodiments of the present disclosure, the bottom entry area 132 may be less than the first and second side entry areas 124 and 126.

Particularly, the first path area 128, the second path area 130, and the bottom path area 134 may be defined as a controlled flow of the fluid 120 from the reservoir 108 at positive pressure to the central cavity 112 of the tubular block 102. In particular, the first path area 128, the second path area 130, and the bottom path area 134 may facilitate in creation of differential mass flow for the fluid 120 in the central cavity 112 of the tubular block 102 to achieve non-contact levitation of the optical fiber. Moreover, the first path area 128, the second path area 130, and the bottom path area 134 may be formed by virtue of the controlled flow of the fluid 120 from the reservoir 108 to the central cavity 112 of the tubular block 102.

In some embodiments of the present disclosure, the first path area 128, the second path area 130, and the bottom path area 134 may be formed based on an equation: $0.1<Ai/As<3$, where As is side slit flow area.

In some embodiments of the present disclosure, the first path area 128 and the first entry area 124, the second path area 130 and the second entry area 126, and the bottom path area 134 and the bottom entry area 132 may have first through third ratios, respectively. Particularly, the first through third ratios may be defined by:

$$Ai^2/Ao^2,$$

Where:

Ai refers to an input flow area (square meter ($m^2$), square feet ($ft^2$)); and Ao refers to a flow area at the optical fibre interaction with the fluid 120 ($m^2$, $ft^2$).

In accordance with an embodiment of the present invention, the first through third ratios may be in a range of 0.045 to 0.45.

In some embodiments of the present disclosure, at least one of the first side slit 116*a*, the second side slit 116*b*, and the bottom slit 122 may have a variable dimension such that the entry area the first side slit 116*a*, the second side slit 116*b*, and the bottom slit 122 is greater than the path area. Particularly, the first entry area 124 may be greater than the first path area 128, the second entry area 126 may be greater than the second path area 130, and the bottom entry area 132 may be greater than the bottom path area 134. Moreover, the first entry area 124, the second entry area 126, and the bottom entry area 132 may be greater than the first path area 128, the second path area 130, and the bottom path area 134, respectively, to facilitate in creation of differential mass flow rates to achieve a stable flow pattern thus causing the optical fiber to levitate. Further, the first side slit 116*a* and the second side slit 116*b* may have a width that may be in a range of 200 micrometres (μm) to 500 μm. Preferably, the width of the first side slit 116*a* and the second side slit 116*b* may be in a range of 200 μm to 333 μm.

In accordance with an embodiment of the present invention, the bottom slit 122 may be defined by the second ends 106*ab* and 106*bb* of the first and second slit walls 106*a* and 106*b*, respectively. Particularly, the bottom slit 122 may be a V-shaped groove that may be defined by the first and second slit walls 106*a* and 106*b* that are tilted walls of the tubular block 102. In some embodiments of the present disclosure, the bottom slit 122 may have a width that may be in a range of 60 micrometres (μm) to 150 μm.

In some embodiments of the present disclosure, a flow rate Q1 of the bottom slit 122 may be given by an equation that states:

where, p=pressure (Pa, psf (lb/$ft^2$)); 0.01 to 4 bar

ρ=density (kg/$m^3$, slugs/$ft^3$); 0.08 to 1.4 (kg/$m^3$)

v=flow velocity (m/s, ft/s); 50 m/s to 900 m/s

Q=flow rate ($m^3$/s, $ft^3$/s);

Ai=input flow area ($m^2$, $ft^2$); 0.000012 to 0.00005 ($m^2$)

Ao=flow area at the fibre interaction with gas ($m^2$, $ft^2$); 0.00016 to 0.2 $m^2$ cd=discharge coefficient; 0.9-1.2 cp=pressure coefficient; −3 to 1

L=length of the orifice [mm], 400-500 [mm]

D=Diameter of the orifice, 30μ-125μ

Fnet=net force acting on the fibre in the direction of the motion of fibre; 0.15-0.25

Pi=input pressure; 0.01 to 4 bar

Qi=input mass flow rate; 0.5 to 2 (kg·$m^3$/s)

Figure 1C:
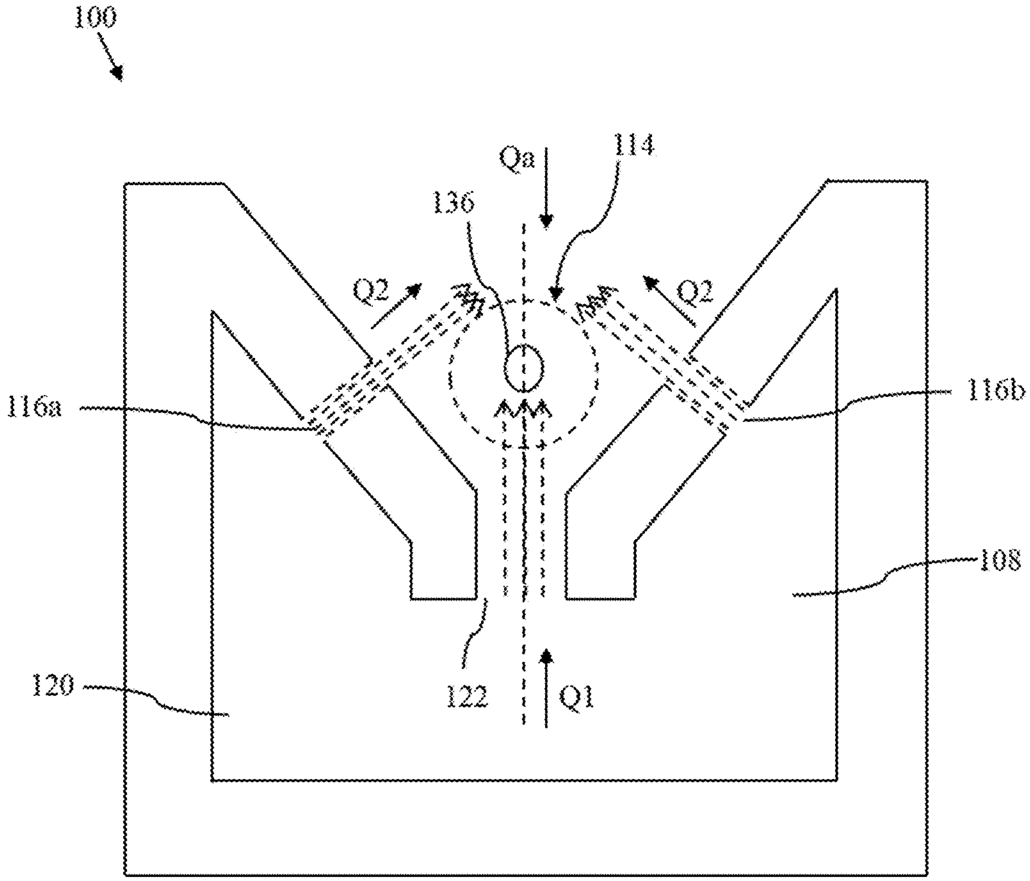
FIG. 1C illustrates yet another cross-sectional view of the apparatus in accordance with an embodiment of the present disclosure.

=angle at which the gas hitting on to the surface of the bare optical fibre: 0 degree to 90 degree FIG. 1C illustrates yet another cross-sectional view of apparatus 100. As illustrated, the containment zone 114 may be created by virtue of the controlled mass flow rates of the fluid 120 from the first side slit 116*a*, the second side slit 116*b*, and the bottom slit 122. In operation, prior to letting an optical fiber 136 enter the apparatus 100, the containment zone 114 may be created.

In accordance with an embodiment of the present invention, to create the containment zone 114, the fluid 120 may be flown from the reservoir 108 into at least one slit (e.g., the first side slit 116*a*, the second side slit 116*b*, and the bottom slit 122). The fluid 120 may be flown from the reservoir 108 into the first side slit 116*a*, the second side slit 116*b*, and the bottom slit 122 at controlled mass flow rates. Particularly, the fluid 120 may be directed at the controlled mass flow rate to at least one slit of the first and second side slits 116*a* and 116*b* and the bottom slit 122 directly at the optical fiber 136. Moreover, the fluid 120 may not be directed on the optical fiber 136 through at least one slit of the first and second side slits 116*a* and 116*b* and the bottom slit 122. Further, to create the containment zone 114, the fluid 120 may be directed at the controlled mass flow rate to a first side of the optical fiber 136 through at least one slit of the first and second side slits 116*a* and 116*b* and the bottom slit 122. Furthermore, the fluid 120 may be directed at the controlled mass flow rate to a second side of the optical fiber 802 through at least one remaining slit of the first and second side slits 116*a* and 116*b* and the bottom slit 122 to create the containment zone 114.

In accordance with an embodiment of the present invention, a mass flow rate Q2 of the fluid 120 from the second side slit 116*b* may be greater than the mass flow rate Q1 of the fluid 120 from the bottom slit 122 that may be required to just lift the optical fiber 136 during drawing of the optical fiber 136 from different directions. In some embodiments of the present disclosure, the fluid 120 from the first side slit 116*a* may have a mass flow rate Q2. The containment zone 114 may be created by virtue of the difference in the mass flow rates of the first and second side slits 116*a* and 116*b* compared to the bottom slit 122. Particularly, the first side slit 116*a*, the second side slit 116*b*, and the bottom slit 122 may be pumped with the fluid 120 having differential mass flow rates such that the mass flow rates after exiting the first side slit 116*a*, the second side slit 116*b*, and the bottom slit 122 may combine with each other to form the containment zone 114. Further, the difference in the mass flow rates may be realized due to a difference in the first and second ratio Ai/As.

In accordance with an embodiment of the present invention, the optical fiber 136 in containment zone 114 may be substantially parallel to an axis of the tubular block 102 that defines a direction of levitation of the optical fiber 136 in the containment zone 114.

In some embodiments of the present disclosure, the mass flow rates Q2 of the first and second side slits 116*a* and 116*b* may be equal and the mass flow rate Q1 of the bottom slit 122 may be different from the mass flow rates of the first and second side slits 116*a* and 116*b*.

In accordance with an embodiment of the present invention, the containment zone 114 may further receive the fluid 120 from a surrounding atmosphere having a mass flow rate Qa such that the mass flow rate Q1 of the fluid 120 from the bottom slit 122, the mass flow rate Q2 of the fluid 120 from the first and second side slits 116*a* and 116*b*, and the mass flow rate Qa of the fluid 120 from the surrounding atmosphere are related as Q2>Q1>Qa. In other words, the mass flow rate Q2 of the fluid 120 from the first and second side slits 116*a* and 116*b* may be greater than the mass flow rate Q1 of the fluid 120 from the bottom slit 122. Further, the mass flow rate Q1 of the fluid 120 from the bottom slit 122 may be greater than the mass flow rate Qa of the fluid 120 from the surrounding atmosphere. The aforementioned relation between the mass flow rate Q1 of the fluid 120 from the bottom slit 122, the mass flow rate Q2 of the fluid 120 from the first and second side slits 116*a* and 116*b*, and the mass flow rate Qa of the fluid 120 from the surrounding atmosphere may ensure stable levitation of the optical fiber 136.

In accordance with an embodiment of the present invention, when the difference in the mass flow rates of the first and second side slits 116*a* and 116*b* compared to the bottom slit 122 is not maintained, in such scenario, the optical fiber 136 may not levitate and hence the optical fiber 136 may touch a surface of the bottom slit 122 thus adding up more attenuation inside the optical fiber 136.

In some embodiments of the present disclosure, the mass flow rates of the fluid 120 through the first side slit 116*a*, the second side slit 116*b*, and the bottom slit 122 from the reservoir 108 may be greater than 0.5 Kilogram/meter cubic/second (kg/$m^3$/s). Alternatively, the mass flow rates of the fluid 120 through the bottom slit 122 may be in a range of 0.5 kg/$m^3$/s to 2 kg/$m^3$/s.

Preferably, the mass flow rate of the fluid 120 through the bottom slit 122 may be in a range of 0.78 kg/$m^3$/s to 1.86 kg/$m^3$/s. Alternatively, the mass flow rates of the fluid 120 through the first side slit 116*a* and the second side slit 116*b* may be in a range of 2.59 kg/$m^3$/s to 6.19 kg/$m^3$/s. Particularly, the mass flow rates of the fluid 120 through the first side slit 116*a* and the second side slit 116*b* may be 3.333 times greater than the mass flow rates of the fluid 120 through the bottom slit 122.

In accordance with an embodiment of the present invention, the difference in the mass flow rates of the first side slit 116*a*, the second side slit 116*b*, and the bottom slit 122 may ensure stable levitation of the optical fiber 136. Once the containment zone 114 is created, the optical fiber 136, after exit from a draw furnace (not shown), may enter the apparatus 100. The optical fiber 136 may pneumatically levitate in the containment zone 114 of the apparatus 100 in a non-contact manner by virtue of the differential mass flow rates from the first side slit 116*a*, the second side slit 116*b*, and the bottom slit 122.

In some aspect of the present disclosure, for stable levitation of the optical fiber 136, the width of the bottom slit 122 may be in a range of 60 μm to 150 μm and the width of the first and second side slits 116*a* and 116*b* may be in a range of 200 μm to 500 μm.

In one aspect of the present disclosure, for stable levitation of the optical fiber 136, the width of the bottom slit 122 is selected to be in the range of 60 μm to 100 μm and the width of the first and second side slits 116*a* and 116*b* is selected to be in the range of 200 μm to 333 μm. By virtue of the width of the bottom slit 122, the mass flow rate of the fluid 120 through the bottom slit 122 is in the range of 0.78 $kg/m^3/s$ to 1.86 $kg/m^3/s$. Further, by virtue of the width of the first and second side slits 116*a* and 116*b* the mass flow rates of the fluid 120 through the first and second side slits 116*a* and 116*b* is 2.59 $kg/m^3/s$ to 6.19 $kg/m^3/s$ that is approximately 3.333 times greater that the mass flow rate of the fluid 120 through the bottom slit 122.

In accordance with an embodiment of the present invention, the variable dimension of at least one of the first side slit 116*a*, the second side slit 116*b*, and the bottom slit 122 may facilitate in stable levitation of the optical fiber 136.

Figure 2:
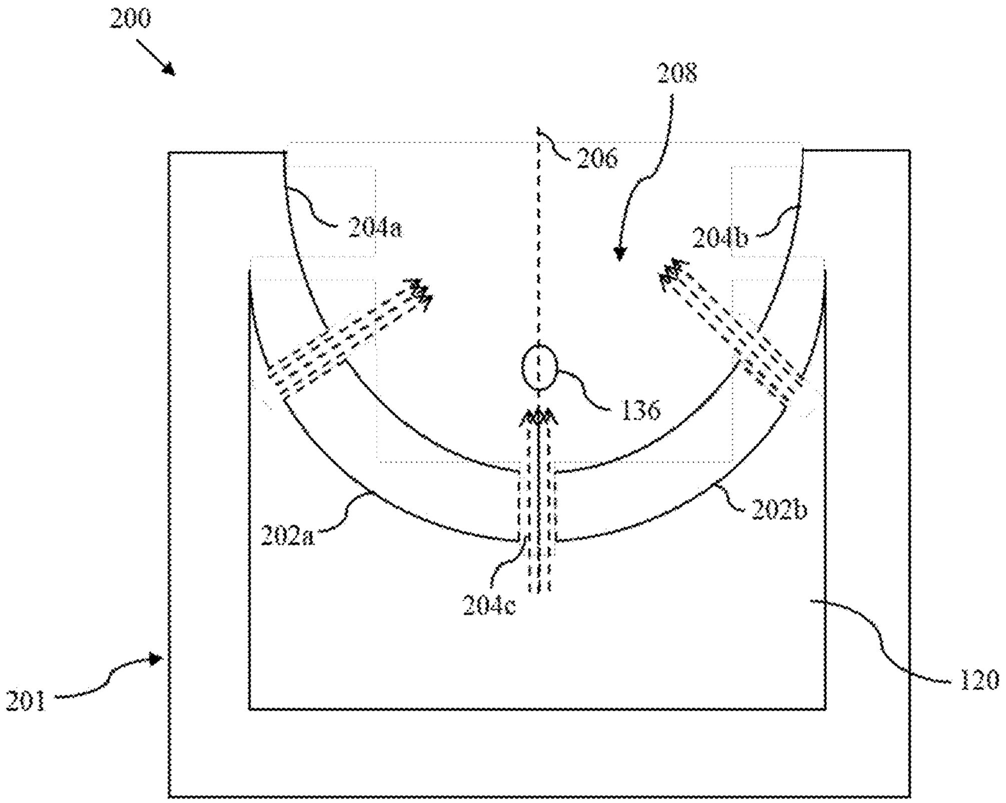
FIG. 2 illustrates an orientation of first and second slits and a bottom slit in accordance with an embodiment of the present disclosure.

FIG. 2 illustrates an orientation 200 of first and second slits and a bottom slit. The tubular block 201 that may be functionally similar to the tubular block 102 may have a first slit wall 202*a* and a second slit wall 202*b*. Particularly, the first slit wall 202*a* and the second slit wall 202*b* may be arc shaped walls that may together form a U-shaped structure as opposed to a V-shaped structure formed by the first slit wall 106*a* and the second slit wall 106*b* of the tubular block 102. Further, the first slit wall 202*a* and the second slit wall 202*b* may have a first side slit 204*a* and a second side slit 204*b*, respectively. As illustrated, the first side slit 204*a* and the second side slit 204*b* may be disposed at a first predefined angle with respect to a longitudinal axis 206 of the tubular block 201.

In some embodiments of the present disclosure, the first predefined angle may be in a range of 5 degree to 90 degrees. Particularly, the first slit wall 202*a* and the second slit wall 202*b* may define a bottom slit 204*c* such that the fluid 120 may be flown through the first side slit 204*a*, the second side slit 204*b*, and the bottom slit 204*c* at differential mass flow rates thus creating a containment zone 208. The containment zone 208 may be similar to the containment zone 114 may facilitate levitation of the optical fiber 136 in a non-contact manner.

Figure 3:
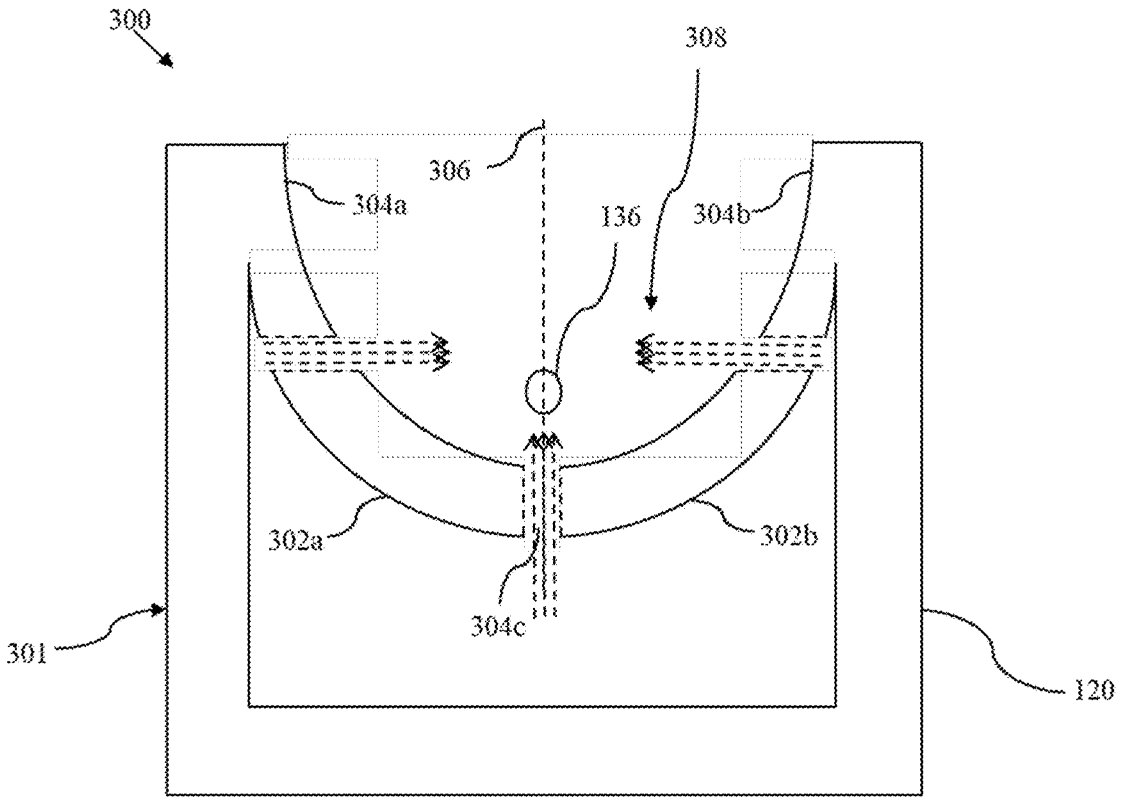
FIG. 3 illustrates another orientation of first and second slits and a bottom slit in accordance with an embodiment of the present disclosure.

FIG. 3 illustrates another orientation 300 of first and second slits and a bottom slit. The tubular block 301 that may be functionally similar to the tubular block 102 (as shown in FIG. 1A) may have a first slit wall 302*a* and a second slit wall 302*b*. Particularly, the first slit wall 302*a* and the second slit wall 302*b* may be arc shaped walls that may together form a U-shaped structure as opposed to the V-shaped structure formed by the first slit wall 106*a* and the second slit wall 106*b* of the tubular block 102 (as shown in FIG. 1A). Moreover, the first slit wall 302*a* and the second slit wall 302*b* may have a first side slit 304*a* and a second side slit 304*b*, respectively. Further, the first side slit 304*a* and the second side slit 304*b* may be disposed at an angle of 90 degrees with respect to a longitudinal axis 306 of the tubular block 301. Furthermore, the first slit wall 302*a* and the second slit wall 302*b* may define a bottom slit 304*c* that may be substantially perpendicular to a longitudinal axis 306 of the tubular block 301 such that the fluid 120 may be flown through the first side slit 304*a*, the second side slit 304*b*, and the bottom slit 304*c* at differential mass flow rates thus creating a containment zone 308. The containment zone 308 may be similar to the containment zone 114 may facilitate levitation of the optical fiber 136 in a non-contact manner.

Figure 4:
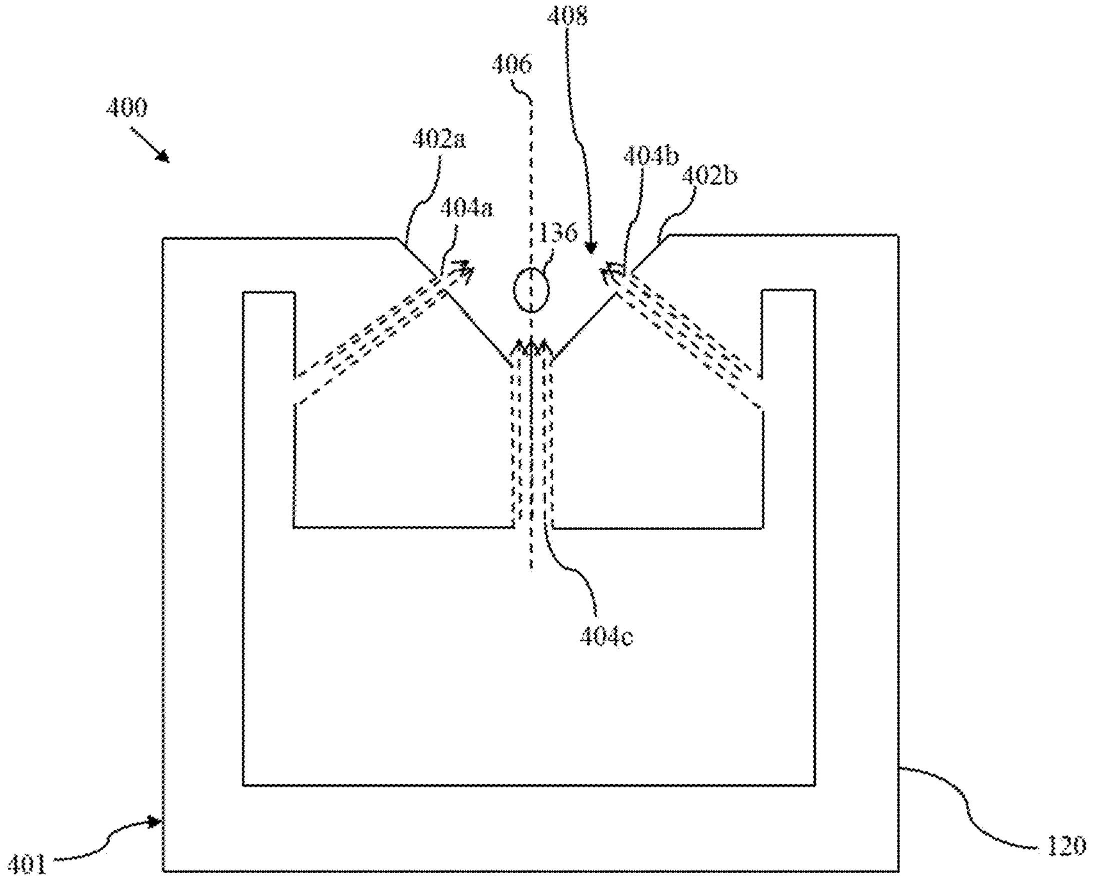
FIG. 4 illustrates yet another orientation of first and second slits and a bottom slit in accordance with an embodiment of the present disclosure.

FIG. 4 illustrates yet another orientation 400 of first and second slits and a bottom slit. In some embodiments of the present disclosure, a tubular block 401 that may be functionally similar to the tubular block 102 (as shown in FIG. 1A) may have a first slit wall 402*a* and a second slit wall 402*b*. Particularly, the first slit wall 402*a* and the second slit wall 402*b* may be similar to the first slit wall 106*a* and the second slit wall 106*b* of the tubular block 102 (as shown in FIG. 1A). The first slit wall 402*a* and the second slit wall 402*b* may have a first side slit 404*a* and a second side slit 404*b*, respectively. As illustrated, the first side slit 404*a* and the second side slit 404*b* may be disposed at a second predefined angle with respect to a horizontal axis of the tubular block 401.

In some embodiments of the present disclosure, the second predefined angle may be in a range of 5 degrees to 90 degrees. Further, the first slit wall 402*a* and the second slit wall 402*b* may define a bottom slit 404*c* that may be substantially perpendicular to a longitudinal axis 406 of the tubular block 401 such that the fluid 120 is flown through the first side slit 404*a*, the second side slit 404*b*, and the bottom slit 404*c* at differential mass flow rates thus creating a containment zone 406. The containment zone 408 may be similar to the containment zone 114 (as shown in FIG. 1A) that may facilitate levitation of the optical fiber 136 in a non-contact manner.

Figure 5:
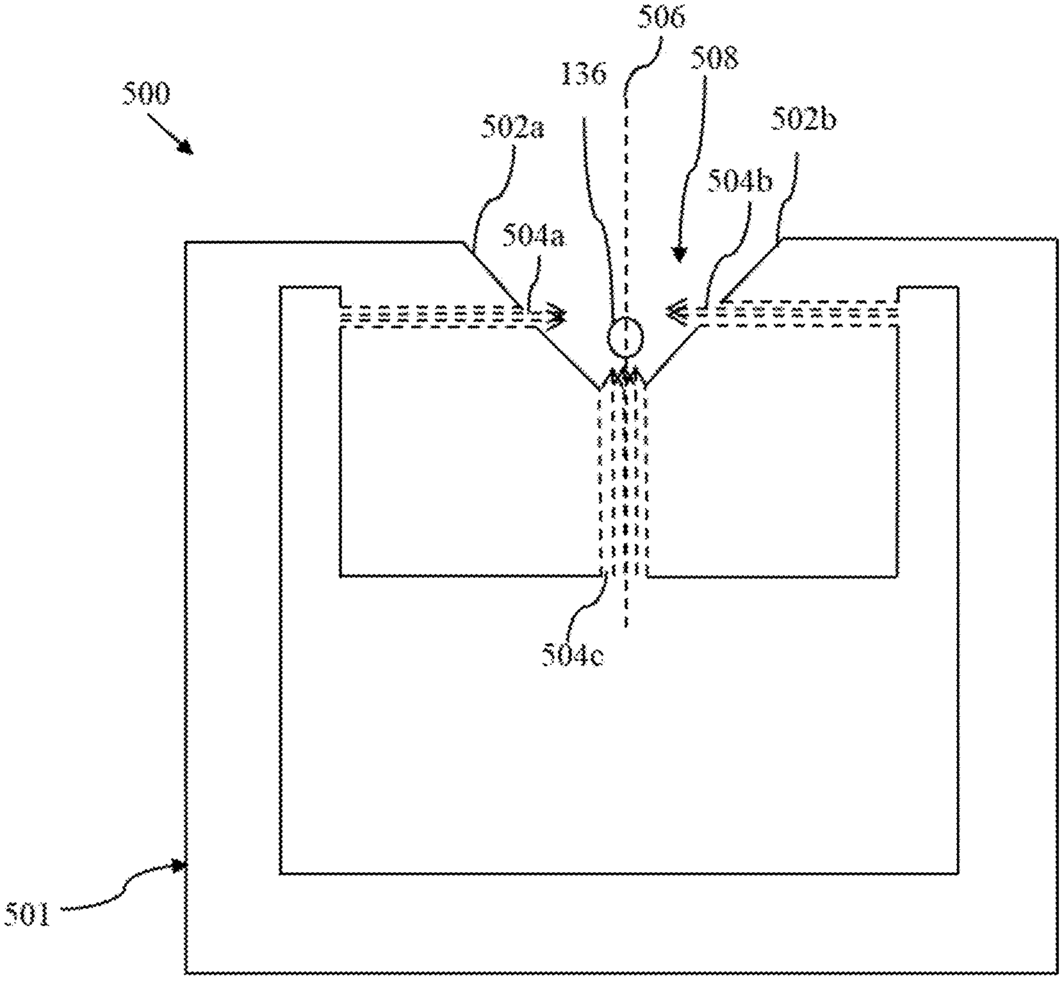
FIG. 5 illustrates yet another orientation of first and second slits and a bottom slit in accordance with an embodiment of the present disclosure.

FIG. 5 illustrates yet another orientation 500 of first and second slits and a bottom slit. A tubular block 501 that may be functionally similar to the tubular block 102 (as shown in FIG. 1A) may have a first slit wall 502*a* and a second slit wall 502*b*. Particularly, the first slit wall 502*a* and the second slit wall 502*b* may be similar to the first slit wall 106*a* and the second slit wall 106*b* of the tubular block 102 (as shown in FIG. 1A). The first slit wall 502*a* and the second slit wall 502*b* may have a first side slit 504*a* and a second side slit 504*b*, respectively. As illustrated, the first side slit 504*a* and the second side slit 504*b* may be disposed at an angle of 90 degrees with respect to a longitudinal axis of the tubular block 501. Further, the first slit wall 502*a* and the second slit wall 502*b* may define a bottom slit 504*c* that may be substantially perpendicular to a longitudinal axis 506 of the tubular block 501 such that the fluid 120 may be flown through the first side slit 504*a*, the second side slit 504*b*, and the bottom slit 504*c* at differential mass flow rates thus creating a containment zone 506. The containment zone 506 may be similar to the containment zone 114 (as shown in FIG. 1A) that may facilitate levitation of the optical fiber 136 in a non-contact manner.

Figure 6:
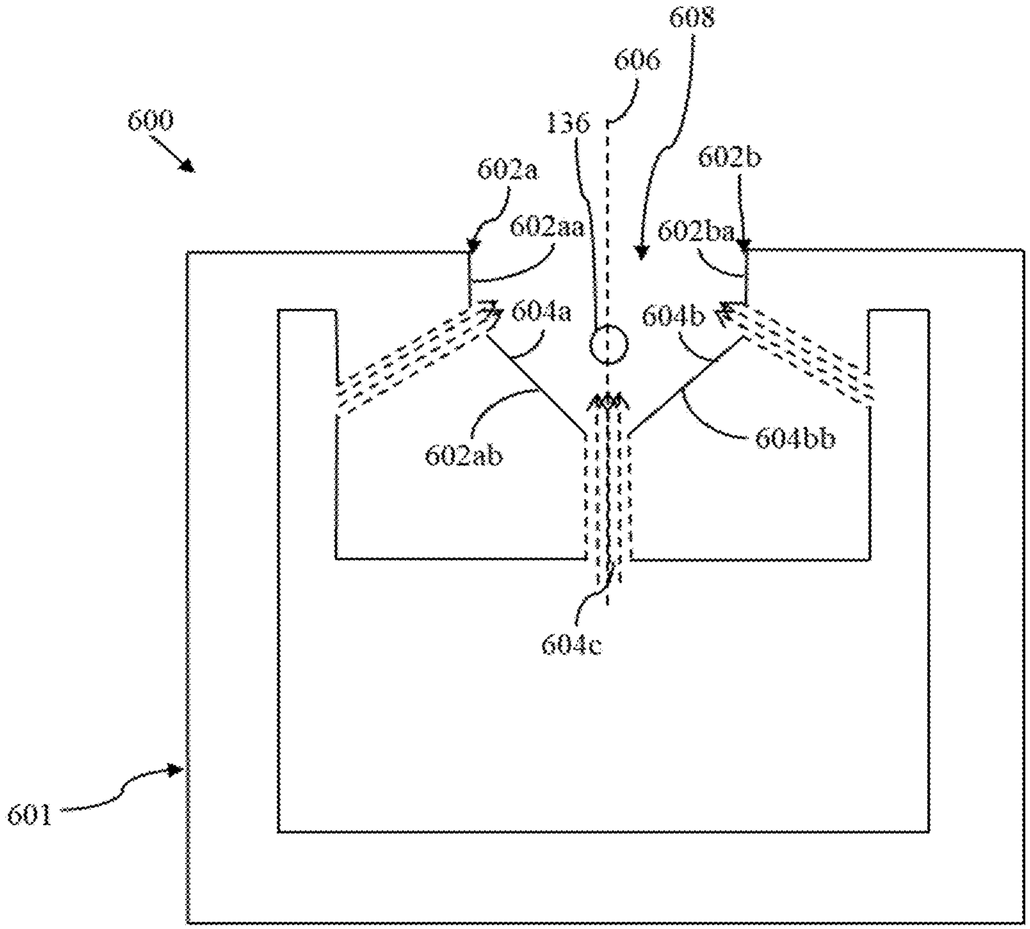
FIG. 6 illustrates yet another orientation of first and second slits and a bottom slit in accordance with an embodiment of the present disclosure.

FIG. 6 illustrates yet another orientation 600 of first and second slits and a bottom slit. A tubular block 601 that may be functionally similar to the tubular block 102 may have a first slit wall 602*a* and a second slit wall 602*b*. Particularly, the first slit wall 602*a* and the second slit wall 602*b* may be similar to the first slit wall 106*a* and the second slit wall 106*b* of the tubular block 102 (as shown in FIG. 1A). However, the first slit wall 602*a* may have a first portion 602*aa* and a second portion 602*ab* such that the first portion 602*aa* is a vertical portion of the first slit wall 602*a* and the second portion 602*ab* is a tilted portion of the first slit wall 602*a*. Similarly, the second slit wall 602*b* may have a first portion 602*ba* and a second portion 602*bb* such that the first portion 602*ba* is a vertical portion of the second slit wall 602*b* and the second portion 602*bb* is a tilted portion of the second slit wall 602*b*.

In accordance with an embodiment of the present invention, the first slit wall 602*a* and the second slit wall 602*b* may have a first side slit 604*a* and a second side slit 604*b*, respectively. As illustrated, the first side slit 604*a* and the second side slit 604*b* may be disposed at an interface of the first and second portions 602*aa* and 602*ab* of the first slit wall 602*a* and at an interface of the first and second portions 602*ba* and 602*bb* of the second slit wall 602*b*, respectively. Particularly, the first side slit 604*a* and the second side slit 604*b* may be disposed at a third predefined angle with respect to a longitudinal axis 606 of the tubular block 601.

In some embodiments of the present disclosure, the third predefined angle may be in a range of 5 degrees to 90 degrees. Further, the first slit wall 602*a* and the second slit wall 602*b* may define a bottom slit 604*c* that may be substantially perpendicular to the horizontal axis of the tubular block 600 such that the fluid 120 is flown through the first side slit 604*a*, the second side slit 604*b*, and the bottom slit 604*c* at differential mass flow rates thus creating a containment zone 608. The containment zone 608 may be similar to the containment zone 114 (as shown in FIG. 1A) that may facilitate levitation of the optical fiber 136 in a non-contact manner.

Figure 7:
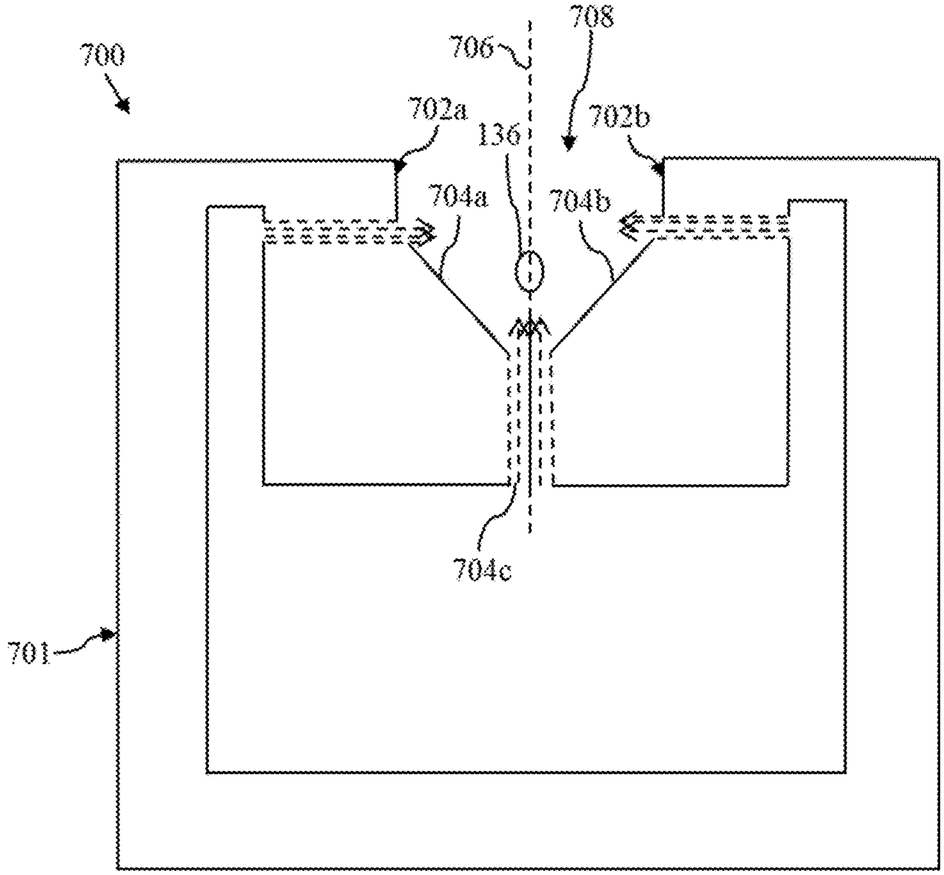
FIG. 7 illustrates yet another orientation of first and second slits and a bottom slit in accordance with an embodiment of the present disclosure.

FIG. 7 illustrates yet another orientation 700 of first and second slits and a bottom slit. A tubular block 701 that may be functionally similar to the tubular block 102 (as shown in FIG. 1A) may have a first slit wall 702*a* and a second slit wall 702*b*. Particularly, the first slit wall 702*a* and the second slit wall 702*b* may be similar to the first slit wall 602*a* and the second slit wall 602*b* (as shown in FIG. 6). The first slit wall 702*a* and the second slit wall 702*b* may have a first side slit 704*a* and a second side slit 704*b*, respectively.

As illustrated, the first side slit 704*a* and the second side slit 704*b* may be disposed at an angle of 180 degrees with respect to a horizontal axis of the tubular block 701. Further, the first slit wall 702*a* and the second slit wall 702*b* may define a bottom slit 704*c* that may be substantially perpendicular to a longitudinal axis 706 of the tubular block 701 such that the fluid 120 may be flown through the first side slit 704*a*, the second side slit 704*b*, and the bottom slit 704*c* at differential mass flow rates thus creating a containment zone 708. The containment zone 708 may be similar to the containment zone 114 (as shown in FIG. 1A) that may facilitate levitation of the optical fiber 136 in a non-contact manner.

In accordance with an embodiment of the present invention, a change of a shape and angle of the slits (i.e., the first side slit 116*a*, 204*a*, 304*a*, 404*a*, 504*a*, 604*a*, and 704*a*, the second side slit 116*b*, 204*b*, 304*b*, 404*b*, 504*b*, 604*b*, and 704*b*, and the bottom slit 122, 204*c*, 304*c*, 404*c*, 504*c*, 604*a*, and 704*a*) and combination of different shapes with different orientations may ensure a stable levitation of the optical fiber 136 irrespective of the mass flow rates of the fluid 120 above minimum mass flow rates.

Figure 8:
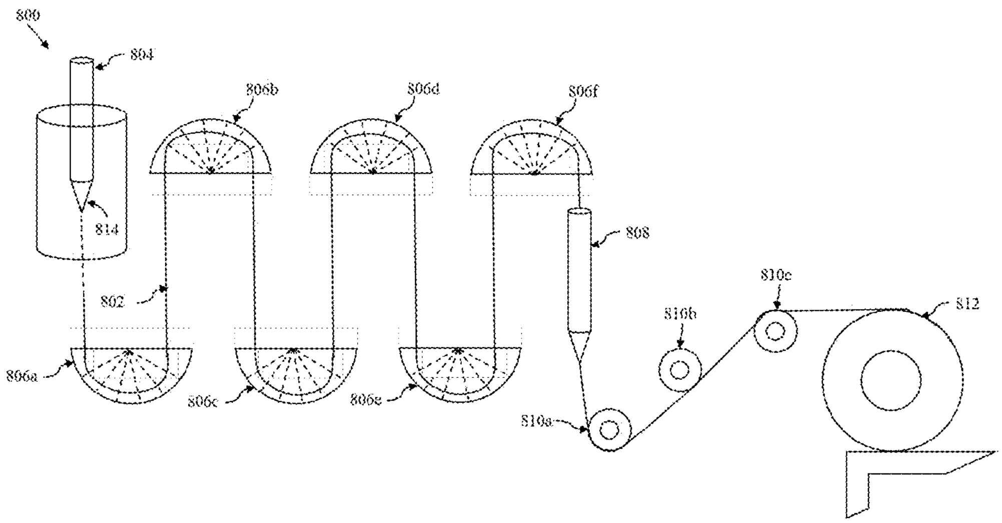
FIG. 8 illustrates a setup for manufacturing an optical fiber in accordance with an embodiment of the present disclosure.

In one aspect of the present disclosure, FIG. 8 illustrates a setup 800 for manufacturing an optical fiber 802. In particular, the setup 800 may have a furnace 804, a plurality of apparatuses of which first through sixth apparatuses 806*a*-806*f* are shown, a coating section 808, a plurality of rollers of which first through third rollers 810*a*-810*c*, and a spool 812. The furnace 804 may have a glass preform 814 from which the optical fiber 802 may be manufactured. Moreover, the first through sixth apparatuses 806*a*-806*f* may be arranged in a way that the first apparatus 806*a*, the third apparatus 806*c*, and the fifth apparatus 896*e* may be horizontally aligned with each other and the second apparatus 806*b*, the fourth apparatus 806*d*, and the sixth apparatus 896*f* may be horizontally aligned with each other. Further, the first apparatus 806*a* and the second apparatus 806*b* may be arranged opposite to each other such that the optical fiber 802 exiting from the first apparatus 806*a* enters the second apparatus 806*b*.

In accordance with an embodiment of the present invention, the optical fiber 802 (i.e., a bare optical fiber) may enter the first apparatus 806*a* at a temperature that may be in a range of 1050 Degree Celsius (° C.) to 1400° C. Similarly, the second apparatus 806*b* and the third apparatus 806*c* may be arranged opposite to each other such that the optical fiber 802 exiting from the second apparatus 806*b* enters the third apparatus 806*c*.

In accordance with an embodiment of the present invention, the third apparatus 806*c* and the fourth apparatus 806*d* may be arranged opposite to each other such that the optical fiber 802 exiting from the third apparatus 806*c* enters the fourth apparatus 806*d*. Similarly, the fourth apparatus 806*d* and the fifth apparatus 806*e* may be arranged opposite to each other such that the optical fiber 802 exiting from the fourth apparatus 806*d* enters the fifth apparatus 806*e*. Similarly, the fifth apparatus 806*e* and the sixth apparatus 806*f* may be arranged opposite to each other such that the optical fiber 802 exiting from the fifth apparatus 806*e* enters the sixth apparatus 806*f*. Although FIG. 8 illustrates that the plurality of apparatuses includes six apparatuses (i.e., the first through sixth apparatuses 806*a*-806*f*), it will be apparent to a person skilled in the art that the scope of the present disclosure is not limited to it. In various other embodiments, the plurality of apparatuses may include any number of apparatuses without deviating from the scope of the present disclosure. In such a scenario, each apparatus may be adapted to perform one or more functionalities in a manner similar to the functionalities of the first through sixth apparatuses 806*a*-806*f* as described herein.

In accordance with an embodiment of the present invention, first through sixth apparatuses 806*a*-806*f* may be adapted to bend the optical fiber 802 from 1° to 270° in a non-contact manner. Particularly, the tubular block (e.g., the tubular blocks 102, 201, 301, 401, 501, 601, 701) of the first through sixth apparatuses 806*a*-806*f* may have an aerodynamic bearing radius of curvature. The aerodynamic bearing radius of curvature of the tubular block (e.g., the tubular blocks 102, 201, 301, 401, 501, 601, 701) may be defined as a minimum bend radius (MBR) of the optical fiber 802 below which the optical fiber 802 may break. Particularly, the aerodynamic bearing radius of curvature of the tubular block (e.g., the tubular blocks 102, 201, 301, 401, 501, 601, 701) may facilitate to bend and/or change a path of the optical fiber 802 through the arrangement of the first through sixth apparatuses 806*a*-806*f* to form a desired radius of curvature. In some embodiments of the present disclosure, the aerodynamic bearing radius of curvature may be in a range of 55 mm to 100 mm. The aerodynamic bearing radius of curvature in the range of 55 mm to 100 mm enables bending and/or changing the path of the optical fiber 802 without breaking the optical fiber 802.

In accordance with an embodiment of the present invention, the optical fiber 802 may be pulled through the first through sixth apparatuses 806*a*-806*f* such that a resident time of the optical fiber 802 in containment zones (similar to the containment zone 114 of the apparatus 100 as described in FIG. 1A) of each apparatus of the first through sixth apparatuses 806*a*-806*f* may be a function of a speed of pulling the optical fiber 802 and a length of each apparatus of the first through sixth apparatuses 806*a*-806*f*. Particularly, a residence time for optimal cooling of the optical fiber 802 may be determined by using an equation that states/;

The residence time=a circumferential length of each apparatus of the first through sixth apparatuses 806*a*-806*f*/ the speed of pulling the optical fibre 802.

In some embodiments of the present disclosure, the residence time may be in a range of 6 milliseconds (ms) to 250 ms.

In accordance with an embodiment of the present invention, the optical fiber 802 may be cooled by increasing a path length and the residence time of the optical fiber inside a cooling tube 900 (as shown later in FIG. 9) formed between adjacent apparatuses of the first through sixth apparatuses 806*a*-806*f*. Particularly, for manufacturing of ultra-low attenuation optical fibers, the temperature of the optical fiber 802 must be reduced as slowly as possible in a controlled manner in order to achieve less added stress and less density fluctuations inside the optical fiber 802. Thus, the cooling tube 900 may facilitate drawing the optical fiber 802 at a higher speed while cooling the optical fiber 802 slowly without increasing the height of the setup 800.

In accordance with an embodiment of the present invention, the coating section 808 may be disposed adjacent to the sixth apparatus 806*f* such that the optical fiber 802 passes through the coating section 808 and is coated with a coating material. Particularly, prior to entering the coating section 808, the optical fiber 802 may be cooled down to an ambient temperature by virtue of the first through sixth apparatuses 806*a*-806*f*. The coating material may include, but not is limited to, Ultraviolet (UV) acrylates, silicone, hard clad (fluorinated acrylate), polyimide, and the like.

Embodiments of the present disclosure are intended to have and otherwise cover any type of the coating material for coating the optical fiber 802, including known, related, and later developed materials. The first through third rollers 810*a*-810*c* may be adapted to receive the optical fiber 802 such that the optical fiber 802 coated with the coating material may pass to the spool 812 and the optical fiber 802 may be winded onto the spool 812. Although FIG. 8 illustrates that the plurality of rollers includes three rollers (i.e., the first through third rollers 810*a*-810*c*), it will be apparent to a person skilled in the art that the scope of the present disclosure is not limited to it. In various other embodiments, the plurality of rollers may include any number of rollers without deviating from the scope of the present disclosure.

Figure 9:
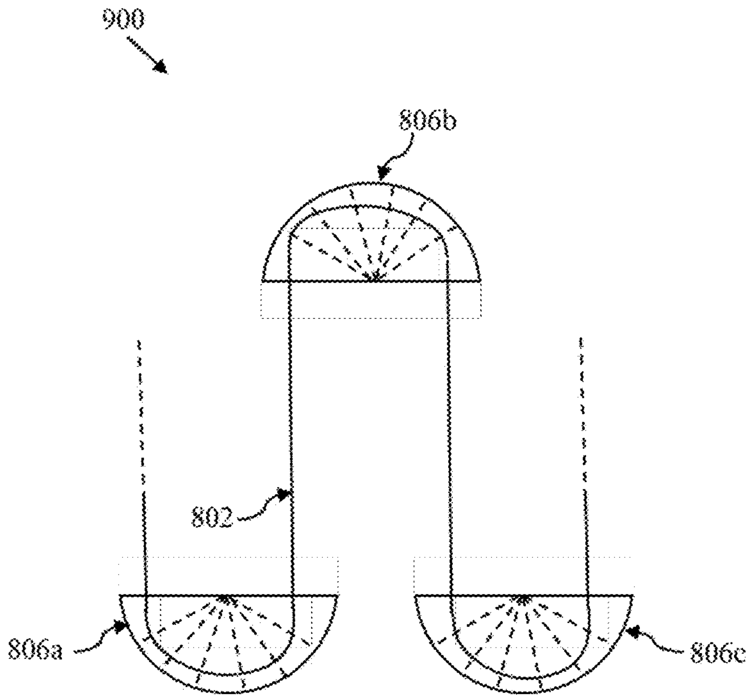
FIG. 9 illustrates a cooling tube of the setup in accordance with an embodiment of the present disclosure; and, FIG. 10 illustrates a flowchart of a method for manufacturing an optical fiber in accordance with an embodiment of the present disclosure.

FIG. 9 illustrates the cooling tube 900 of the setup 800 having optical fiber 802 (i.e., a bare optical fiber) entering the first apparatus 806*a*. The second apparatus 806*b* may be arranged opposite to the first and the third apparatus 806*c* such that the optical fiber 802 exiting from the first apparatus 806*a* may bend and enter the second apparatus 806*b* and further exits from the second apparatus 806*b* to bend and enter the third apparatus 806*c*. Further, the optical fiber 802 may be cooled by increasing the path length and the residence time of the optical fiber inside the cooling tube 900 formed by the arrangement of the first through third apparatuses 806*a*-806*c*. The cooling tube 900 may facilitate to draw the optical fiber 802 at a higher speed while cooling the optical fiber 802 slowly to reduce a Rayleigh scattering in the optical fiber 802 and thus producing an ultra low loss optical fiber without increasing the height of the setup 800.

Figure 10:
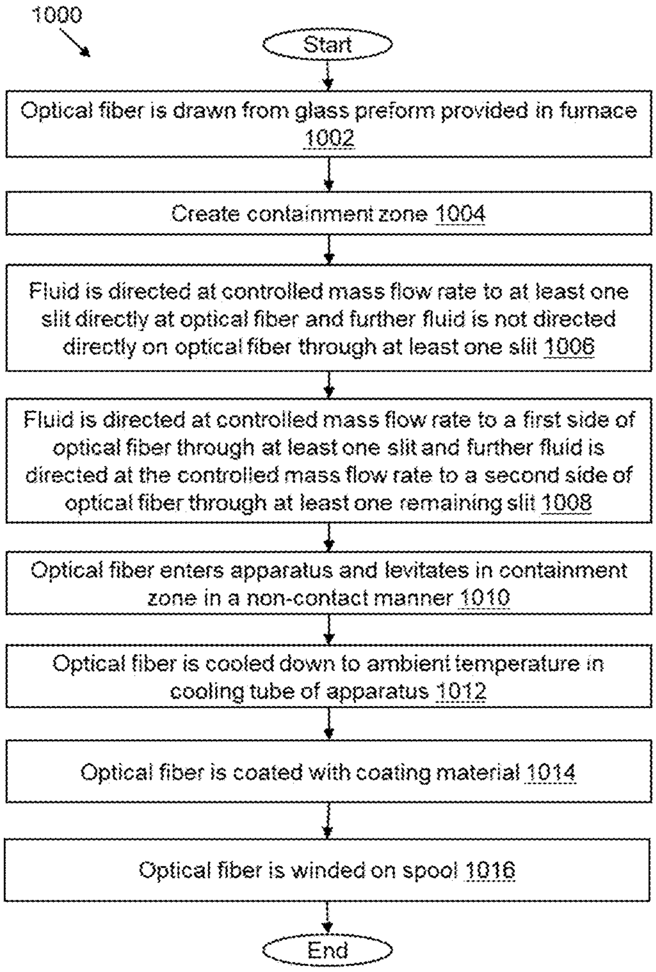

FIG. 10 illustrates a flowchart of a method 1000 for manufacturing the optical fiber 802 by using the setup 800 in accordance with an embodiment of the present invention.

At step 1002, the optical fiber 802 is drawn from the glass preform 814 provided in the furnace 804.

At step 1004, a containment zone (e.g., the containment zone 114 of the apparatus 100) is created. To create the containment zone 114, the fluid 120 is flown from the reservoir 108 into at least one slit (e.g., the first side slit 116*a*, the second side slit 116*b*, and the bottom slit 122). Particularly, the fluid 120 may be flown from the reservoir 108 into the first side slit 116*a*, the second side slit 116*b*, and the bottom slit 122 at controlled mass flow rates.

At step 1006, the fluid 120 is directed at the controlled mass flow rate to at least one slit of the first and second side slits 116*a* and 116*b* and the bottom slit 122 directly at the optical fiber 802 and further the fluid 120 is not directed directly on the optical fiber 802 through at least one slit of the first and second side slits 116*a* and 116*b* and the bottom slit 122, the fluid 120.

At step 1008, the fluid 120 is directed at the controlled mass flow rate to a first side of the optical fiber 802 through at least one slit of the first and second side slits 116*a* and 116*b* and the bottom slit 122 and further, the fluid 120 is directed at the controlled mass flow rate to a second side of the optical fiber 802 through at least one remaining slit of the first and second side slits 116*a* and 116*b* and the bottom slit 122 to create the containment zone 114.

At step 1010, once the containment zone 114 is created, the optical fiber 802 enters the apparatus 100. The optical fiber 802 levitates in the containment zone 114 in a non-contact manner by virtue of the differential mass flow rates for a predefined time.

At step 1012, the optical fiber 802 is cooled down to an ambient temperature in the cooling tube 900.

At step 1014, after cooling the optical fiber 802, the optical fiber 802 is passed through the coating section 808 such that the optical fiber 802 is coated with the coating material.

At step 1016, the optical fiber 802 is winded on the spool 812.

Thus, the setup 800 using the first through sixth apparatuses 806*a*-806*f* may increase a fiber drawing capacity, without increasing the height of the setup 800 by virtue of the arrangement of the first through sixth apparatuses 806*a*-806*f*. Further, the setup 800 using the first through sixth apparatuses 806*a*-806 may facilitate in production of ultra-low attenuation fibres as the optical fiber 802 are levitated in air while the cooling process. Moreover, the first and second side slits 116*a* and 116*b* and the bottom slit 122 provides flexibility to change a diameter (e.g., 125 μm, 100 μm, and 80 μm) of the optical fiber 802 by varying the mass flow rates of the fluid 120. The first through sixth apparatuses 806*a*-806*f* of the setup 800 further facilitate to bend and/or change path of the optical fiber 802 in a non-contact manner without use of any external devices that reduces operating cost of the setup 800 and further a manufacturing cost of the optical fiber 802.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

It will be apparent to those skilled in the art that other embodiments of the invention will be apparent to those skilled in the art from consideration of the specification and practice of the invention. While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention. It is intended that the specification and examples be considered as exemplary, with the true scope of the invention being indicated by the claims.

We claim:

1. An apparatus (100) to levitate an optical fiber (136) in a non-contact manner, the apparatus (100) comprising:
- a tubular block (102) defined by a central cavity (112) and a plurality of slit walls (106*a*, 106*b*), wherein the tubular block (102) comprises a reservoir (108) that is adapted to store a fluid (120) at a positive pressure; and
- wherein each slit wall of the plurality of slit walls (106*a*, 106*b*) comprises one or more side slits (116) and the plurality of slit walls (106*a*, 106*b*) defines a bottom slit (122) such that the one or more side slits (116*a*, 116*b*) and the bottom slit (122) provide one or more paths between the reservoir (108) and the central cavity (112);
- wherein the tubular block is characterized by the one or more side slits (116*a*, 116*b*) has a predefined side slit angle with respect to the longitudinal axis of the tubular block (102), wherein the predefined side slit angle is in a range of 5 degrees to 90 degrees such that a mass flow rate (Q1) of a fluid (122) from the bottom slit (122), a mass flow rate (Q2) of the fluid (122) from the one or more side slits (116*a*, 116*b*), and a mass flow rate (Qa) of the fluid (120) from a surrounding atmosphere is related as Q2>Q1>Qa.

2. The apparatus as claimed in claim 1, wherein the one or more side slits (116) comprising first and second side slits (116*a*, 116*b*).

3. The apparatus as claimed in claim 2, wherein the first and second side slits (116*a*, 116*b*) defines first and second side entry areas (124, 126).

4. The apparatus as claimed in claim 2, wherein at least one slit of the first and second side slits (116*a*, 116*b*) and the bottom slit (122) has a variable dimension such that an entry area of the at least one slit is greater than a path area of the at least one slit.

5. The apparatus as claimed in claim 1, wherein the bottom slit (122) defines a bottom entry area.

6. The apparatus as claimed in claim 5, wherein the bottom slit entry area is less than the first and second side slit entry area (124, 126).

7. The apparatus as claimed in claim 1, wherein the tubular block (102) has a radius of curvature along a length of the tubular block (102).

8. The apparatus as claimed in claim 1, wherein the radius of curvature is greater than or equal to 25 mm.

9. The apparatus as claimed in claim 1, further comprising a containment zone (114), wherein the optical fiber (136) in the containment zone (114) is substantially parallel to an axis of the tubular block (102).

10. The apparatus as claimed in claim 1, wherein a width of the bottom slit (122) is between 60 micrometres (μm) to 150 μm.

11. The apparatus as claimed in claim 1, wherein the bottom slit (122) has a predefined bottom slit angle with respect to a longitudinal axis of the tubular block (102).

12. The apparatus as claimed in claim 11, wherein the predefined bottom slit angle is in a range of 30 degrees to 120 degrees.

13. The apparatus as claimed in claim 1, wherein the one or more side slits (116*a*, 116*b*) has a predefined side slit angle with respect to the longitudinal axis of the tubular block (102).

14. A method to levitate an optical fiber (136), the method comprising:
- creating a containment zone (114) for the optical fiber (136) in an apparatus (100) to levitate the optical fiber (136) to facilitate cooling of the optical fiber (136), wherein, for creating the containment zone (114), the method comprising:
- A first step of directing, a fluid (120) at a controlled mass flow rate to at least one slit of the one or more side slits (116) and the bottom slit (122) directly at the optical fiber (136) and at least one slit of the one or more side slits (116) and the bottom slit (122) not directing the fluid (120) at a controlled mass flow rate directly on the optical fiber (136) wherein the first and second side slits (116*a*) and (116*b*) may define one or more side entry areas and wherein the bottom slit (122) may define a bottom entry area; and
- A second step of directing, the fluid (120) at the controlled mass flow rate to at least one slit of the one or more side slits (116) and the bottom slit (122) not directly on the optical fiber (136); and directing, the fluid (120) at the controlled mass flow rate to a first side of the optical fiber (136) through at least one slit of the one or more side slits (116) and the bottom slit (122) and directing the fluid (120) at the controlled mass flow rate to a second side of the optical fiber (136) through at least one remaining slit of the one or more side slits (116) and the bottom slit (122); and pulling the optical fiber (136) through the containment zone (114) in a non-contact manner wherein a mass flow rate (Q1) of the fluid (120) from the bottom slit (122), a mass flow rate (Q2) of the fluid (120) from the one or more side slits (116), and a mass flow rate (Qa) of the fluid (120) from a surrounding atmosphere is related as Q2>Q1>Qa.

15. The method as claimed in claim 14, wherein the fluid (120) is selected from one of air, combination of gases, and oxygen.

16. The method as claimed in claim 14, wherein the method further comprises pulling the optical fiber (136) through the containment zone (114) such that a residence time of the optical fiber (136) in the apparatus (100) is a function of speed of pulling the optical fiber (136) and a length of the apparatus (100).

17. The method as claimed in claim 14, wherein the one or more side slits (116*a*, 116*b*) has a predefined side slit angle with respect to the longitudinal axis of the tubular block (102).

18. The method as claimed in claim 14, wherein a width of the bottom slit (122) is between 60 micrometres (μm) to 150 μm.

* * * * *